US008665697B1

(12) United States Patent
Venugopalan et al.

(10) Patent No.: US 8,665,697 B1
(45) Date of Patent: Mar. 4, 2014

(54) SUBCHANNEL FORMATION IN OFDMA SYSTEMS

(75) Inventors: Sarad Ammanath Venugopalan, Tamil Nadu (IN); Srikanth Subramanian, Tamil Nadu (IN)

(73) Assignees: KBC Research Foundation Pvt. Ltd., Tamil Nadu (IN); Anna University, Tamil Nadu (IN)

( * ) Notice: Subject to any disclaimer, the term of this patent is extended or adjusted under 35 U.S.C. 154(b) by 499 days.

(21) Appl. No.: 12/645,709

(22) Filed: Dec. 23, 2009

(51) Int. Cl.
*H04J 11/00* (2006.01)
*H04W 36/00* (2009.01)

(52) U.S. Cl.
USPC ........... 370/210; 370/208; 370/328; 370/331; 370/447; 455/437; 455/438

(58) Field of Classification Search
USPC .................................................. 370/328–352
See application file for complete search history.

(56) References Cited

U.S. PATENT DOCUMENTS

| | | | | |
|---|---|---|---|---|
| 6,922,549 B2* | 7/2005 | Lyons et al. | ............... | 455/67.13 |
| 7,307,973 B2* | 12/2007 | Song et al. | ..................... | 370/331 |
| 7,310,379 B2* | 12/2007 | Sibecas et al. | ................ | 375/267 |
| 7,328,228 B2* | 2/2008 | Klein et al. | ................... | 708/250 |
| 7,583,584 B2* | 9/2009 | Wang et al. | .................... | 370/206 |
| 7,613,104 B2* | 11/2009 | Bhatt et al. | .................... | 370/208 |
| 7,742,392 B2* | 6/2010 | Ge et al. | ........................ | 370/208 |
| 7,773,685 B2* | 8/2010 | Tirkkonen et al. | ............ | 375/267 |
| 7,876,840 B2* | 1/2011 | Tong et al. | .................... | 375/260 |
| 7,961,591 B2* | 6/2011 | Abedi | ........................... | 370/208 |
| 8,009,551 B2* | 8/2011 | Wang | ............................. | 370/208 |
| 8,014,377 B2* | 9/2011 | Zhang et al. | ................... | 370/349 |
| 8,243,775 B2* | 8/2012 | Li et al. | .......................... | 375/142 |
| 8,259,867 B2* | 9/2012 | Huang et al. | ................... | 375/341 |
| 8,391,410 B2* | 3/2013 | Wang | ............................. | 375/308 |
| 2004/0002364 A1* | 1/2004 | Trikkonen et al. | ......... | 455/562.1 |
| 2004/0264592 A1* | 12/2004 | Sibecas et al. | ................ | 375/267 |
| 2005/0117539 A1* | 6/2005 | Song et al. | ..................... | 370/328 |
| 2006/0133381 A1* | 6/2006 | Wang | ............................. | 370/394 |
| 2007/0082696 A1* | 4/2007 | Wang | .......................... | 455/550.1 |
| 2007/0105508 A1* | 5/2007 | Tong et al. | .................... | 455/101 |

(Continued)

FOREIGN PATENT DOCUMENTS

CN 101035103 A * 9/2007
EP 2141818 A1 * 1/2010

OTHER PUBLICATIONS

Matsumoto Makoto and Nishimura Takuji, "Mersenne Twister: A 623-Dimensionally Equidistributed Uniform Pseuso-Random Number Generator", ACM Transactions on Modeling and Computer Simulation, 1998, vol. 8, No. 1, pp. 3-30.

(Continued)

*Primary Examiner* — Ayaz Sheikh
*Assistant Examiner* — Venkatesh Haliyur
(74) *Attorney, Agent, or Firm* — Brundidge & Stanger, P.C.

(57) ABSTRACT

Sub-channels in cells of an Orthogonal Frequency Division Multiple Access (OFDMA) network are formed based on random permutations of a set of subcarrier indices. The random permutations are performed for each cell of the network using a pseudo-random number generator (PRNG) and a shuffle technique. Different initial states of the PRNG are used to generate the random permutation of the subcarrier indices for each cell. In an embodiment, sub-carriers represented by a contiguous group of indices in the random permutation obtained for a cell are assigned to form a sub-channel. Interference diversity for the OFDMA network is thereby improved.

16 Claims, 9 Drawing Sheets

(56) References Cited

U.S. PATENT DOCUMENTS

| | | | | |
|---|---|---|---|---|
| 2007/0217329 | A1* | 9/2007 | Abedi | 370/208 |
| 2007/0263735 | A1* | 11/2007 | Tong et al. | 375/260 |
| 2007/0280098 | A1* | 12/2007 | Bhatt et al. | 370/208 |
| 2008/0056116 | A1* | 3/2008 | Ge et al. | 370/203 |
| 2008/0151926 | A1* | 6/2008 | Mosko et al. | 370/447 |
| 2008/0233966 | A1* | 9/2008 | Scheim et al. | 455/452.1 |
| 2008/0253279 | A1* | 10/2008 | Ma et al. | 370/206 |
| 2009/0175389 | A1* | 7/2009 | Huang et al. | 375/341 |
| 2009/0238063 | A1* | 9/2009 | Park et al. | 370/208 |
| 2010/0036900 | A1* | 2/2010 | Ross | 708/254 |
| 2010/0048302 | A1* | 2/2010 | Lutnick et al. | 463/42 |
| 2010/0158079 | A1* | 6/2010 | Li et al. | 375/147 |
| 2010/0290360 | A1* | 11/2010 | Ge et al. | 370/252 |
| 2010/0322225 | A1* | 12/2010 | Kumar et al. | 370/344 |
| 2011/0007657 | A1* | 1/2011 | Kazmi et al. | 370/252 |
| 2011/0029588 | A1* | 2/2011 | Ross | 708/254 |

OTHER PUBLICATIONS

Wilson, Mark C., "Overview of Sattolo's Algorithm" in Algorithms Seminar 2002-2004, F. Chyzak (ed.), Summary by Éric Fusy. INRIA Research Report, Jun. 21, 2004, pp. 105-108.

"Algorithm 235: Random permutation" by Richard Durstenfeld, Jul. 1964, Communications of the ACM 7 (7): 420.

Standard for Local and Metropolitan Area Networks Part 16: Air Interface for Fixed Broadband Wireless Access Systems. IEEE P802.16™, May 29, 2009.

802.16e-2005 and IEEE Std 802.16-2004/Cor1-2005-IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed Bands and Corrigendum, Feb. 1, 2006.

* cited by examiner

| Range | Random | Swap \| Result |
|---|---|---|
| | | 12345\| |
| 1-5 | 3 | 1254\|3 |
| 1-4 | 1 | 425\|13 |
| 1-3 | 2 | 45\|213 |
| 1-2 | 1 | 5\|4213 |

510 — Range
520 — Random
530 — Swap | Result

Row1, Row2, Row3, Row4, Row5

FIG. 5

SUBCHANNEL FORMATION IN OFDMA SYSTEMS

BACKGROUND

OFDM (Orthogonal Frequency Division Multiplexing) generally refers to a frequency division multiplexing technique, in which a serial data stream is transmitted parallely (and simultaneously) over multiple orthogonal carriers. OFDMA (Orthogonal Frequency Division Multiple Access) refers to a multi-user multiple-access communication technique that uses OFDM (Orthogonal Frequency Division Multiplexing).

OFDMA systems may contain multiple base stations (BS), with each base station designed to link users (mobile or subscriber stations) in corresponding geographical areas called cells, and may thus constitute a multi-cellular system. Each cell may, at any given point in time, contain multiple users (subscribers/subscriber stations), that may be either fixed (not moving) or mobile.

In OFDMA systems, one or more sub-carriers are grouped to form a sub-channel, and one or more sub-channels may be assigned to a subscriber. To use available frequency resources (bandwidth) efficiently, the same frequency (same subcarrier) may be allocated to multiple users in the same time interval (or overlapping time intervals) provided the users are located in different cells. This technique is called frequency reuse. As an example, a user located within a cell ('cell-A') may be allocated a set of sub-carriers having frequencies f1, f2, and f3, while another user in a different cell ('cell-B', which may be a neighboring/adjacent cell with respect to 'cell-A') may be allocated sub-carriers f3, f4 and f5, with the same frequency (subcarrier f3) being allocated to both the users.

In general, one or more sub-carriers may be allocated in the same time interval to multiple users, to enable efficient frequency (bandwidth) utilization. However, such an approach may cause interference. In the above example of reuse of frequency f3, proximity of the two users with respect to each other may cause interference (often termed co-channel interference or CCI) in the band corresponding to frequency f3, and thereby degrade communication.

Interference diversity, with respect to OFDMA, is generally a measure/degree of non-commonality of sub-carriers allocated to subscribers. In general, a greater degree of interference diversity corresponds to fewer sub-carriers being common to any two subscribers in an OFDMA system. Thus, an allocation scenario in which a maximum of only one sub-carrier is common among any two subscribers in the OFDMA system is deemed to provide higher interference diversity compared to an allocation scenario in which a maximum of five sub-carriers are common among any two subscribers. It may be appreciated that greater interference diversity among subscribers generally translates to lesser information loss due to interference.

SUMMARY

In one aspect, a computer-implemented method of forming sub-channels in an OFDMA network that contains a plurality of cells is provided. The method comprises receiving a plurality of subcarrier indices representing corresponding sub-carriers to be used for forming sub-channels in cells of said network, generating a random permutation of said plurality of subcarrier indices, and forming a sub-channel in a first cell in said plurality of cells from sub-carriers represented by a portion of said random permutation.

In another aspect, a machine readable medium storing one or more sequences of instructions for causing a computing system to form sub-channels in an OFDMA network containing a plurality of cells is provided. Execution of the one or more sequences of instructions by one or more processors contained in the computing system causes the computing system to perform the actions of receiving a first sequence of sub-carrier indices representing corresponding sub-carriers to be used for forming sub-channels in cells of said network, generating a re-ordered sequence of said sub-carrier indices based on an output of a pseudo-random number generator (PRNG), and forming a sub-channel in a first cell in said plurality of cells using sub-carriers represented by a first set of successive sub-carrier indices in said re-ordered sequence of said sub-carrier indices.

In still another aspect, a system is provided that includes a pseudo random number generator (PRNG), a shuffle block, and a processor. The shuffle block receives a first sequence of sub-carrier indices representing corresponding sub-carriers to be used for forming sub-channels in cells of an OFDMA network, and the shuffle block re-orders the first sequence of sub-carrier indices based on a random number provided by the PRNG, and generates a final sequence of sub-carrier indices. The processor forms a sub-channel for a first cell in the cells using sub-carriers represented by a set of successive sub-carrier indices in the final sequence of sub-carrier indices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 shows a table of an example designed to illustrate the operation of a shuffle algorithm (Sattolo's shuffle).

The drawing in which an element first appears is indicated by the leftmost digits) in the corresponding reference number.

DETAILED DESCRIPTION

1. Example Environment

Figure 1A:
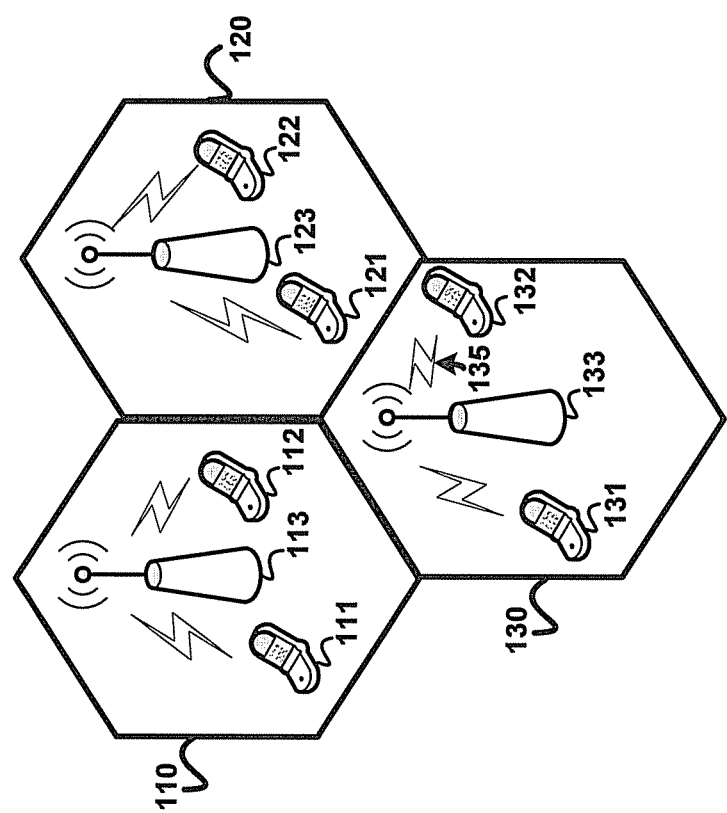
FIG. 1A is a block diagram illustrating an environment in which an example embodiment of an OFDMA network can be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

FIG. 1A is an illustration of an example environment (multi-cellular OFDMA environment). The diagram shows three cells 110, 120 and 130, containing base stations (BS) 113, 123 and 133 respectively. Subscriber or user systems 111 and 112, shown present in cell 110, communicate with each other, and with other subscriber stations through base station (BS) 113. Subscriber systems 121 and 122, shown present in cell 120, communicate with each other, and with other subscriber stations through base station (BS) 123. Subscriber systems 131 and 132, shown present in cell 130, communicate with each other, and with other subscriber stations through base station (BS) 133.

The components and blocks of FIG. 1A are shown merely by way of illustration, and more or fewer components/blocks, both in number and type, may be present in real-world environments, depending on the purpose for which the environment is designed. Subscriber systems shown in FIG. 1A may represent fixed or mobile communication devices, such as cell-phones, computers, mobile internet devices, media players, etc.

Communications from a subscriber station to a base station is termed uplink (UL), and that in the reverse direction is termed downlink (DL). Communication between a BS and a subscriber station takes place on corresponding sub-channels. For example, communications from subscriber station 132 to BS 133 in the uplink (UL) direction may be achieved on a sub-channel (indicated in the Figure as 135), while communications from BS 133 to subscriber station 132 in the downlink (DL) direction may be achieved on another sub-channel (not indicated in the Figure).

Figure 1B:
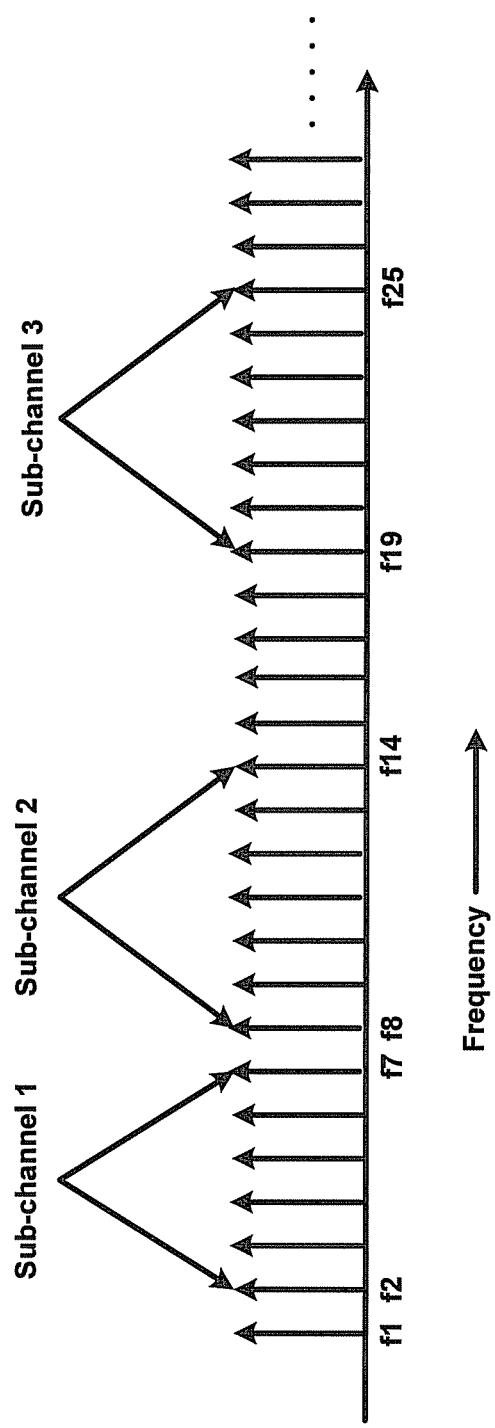
FIG. 1B is a diagram illustrating an example of sub-channel formation from sub-carriers in an OFDMA network.

A sub-channel, in turn, is formed from one or more sub-carriers, examples of which are depicted in FIG. 1B. FIG. 1B shows example sub-carriers that may be specified or designated for use (for forming sub-channels) in the environment of FIG. 1A. As an example, BS 133 may select sub-carriers f2 and f7 to form 'sub-channel 1', sub-carriers f8 and f14 to form 'sub-channel 2', and sub-carriers f19 and f25 to form 'sub-channel 3'. BS 133 may then allocate sub-channel 1 for the downlink communication from BS 133 to subscriber station 131, sub-channel 2 for the downlink communication from BS 133 to subscriber station 132, and sub-channel 3 for downlink communication from BS 133 to another subscriber station, not shown.

BS 133 may similarly allocate sub-channels for the uplink direction. BS 113 and 123 may operate similarly to allocate sub-channels for the uplink (UL) and downlink (DL) communication directions with respect to corresponding subscriber stations. For ease of description, only two sub-carriers are noted as forming a sub-channel in the description above. Other example systems (e.g., IEEE 802.16™, Part 16: Air Interface for Broadband Wireless Access Systems) may specify different numbers of sub-carriers (e.g., 128, 500, 1020, 2048, etc.) to form a sub-channel.

Figure 2A:
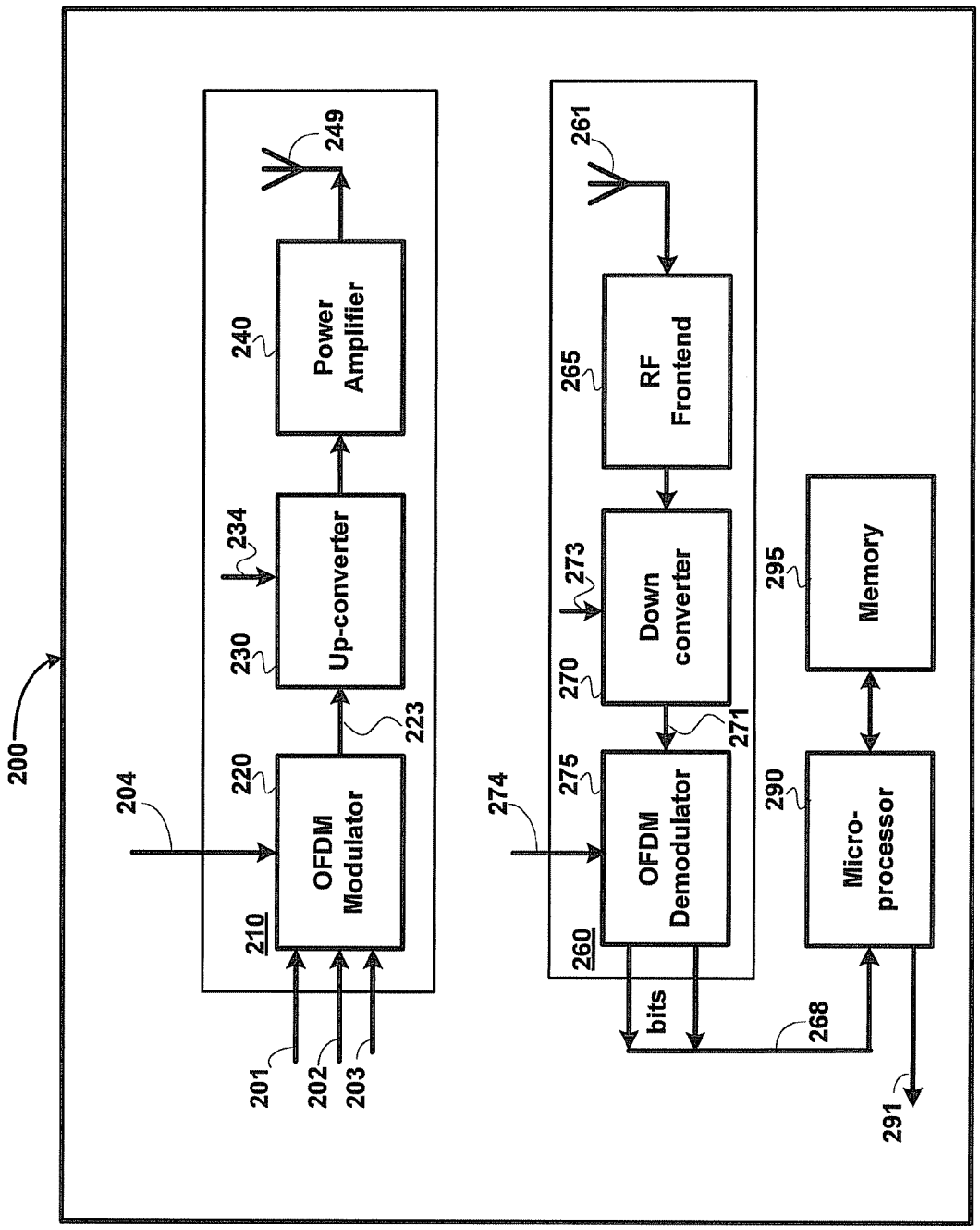
FIG. 2A is a block diagram of an example embodiment of an OFDM transceiver which may be used to implement a base station or a subscriber station.

FIG. 2A shows an example OFDM transceiver 200 (which may be used to implement any of the base stations and subscriber stations of FIG. 1A). Transceiver 200 is shown containing OFDM transmitter 210, OFDM receiver 260, microprocessor 290 and memory 295. The internal details of FIG. 2A are provided merely by way of illustration, and real-world systems may contain many more components/blocks, as suited for the specific environment.

OFDM transmitter 210 is further shown containing OFDM modulator 220, up-converter 230, power amplifier 240 and transmitter antenna 249. OFDM modulator 220 receives multiple bit streams 201-203 (representing data to be transmitted), a corresponding number of sub-carriers indices (sub-carrier frequency values) on path 204, and generates an OFDM multi-carrier signal (at base band) on path 223. Bit streams 201-203 as well as sub-carriers (or sub-carrier indices/sub-carrier frequencies) on path 204 may be received from microprocessor 290 on path 291.

Up-converter 230 receives the OFDM signal on path 223 and shifts the signal to a higher frequency band (e.g., RF) by mixing the OFDM signal using a high frequency carrier 234, generated, for example by a local oscillator within OFDM transmitter 210, not shown in FIG. 2A. Power amplifier 240 amplifies the high frequency signal to a higher power level to enable the signal (provided to antenna 249) to be transmittable over a required range. The amplified signal is then transmitted using transmit antenna 249. Sub-carriers used in OFDM modulator 220 form a corresponding (transmit) sub-channel.

OFDM receiver 260 is shown containing RF front end 265, down-converter 270 and OFDM demodulator 275. RF front-end 265 receives a high frequency signal (RF signal, (contained in a corresponding sub-channel) through antenna 261 and performs amplification and filtering operations to eliminate unwanted frequencies. The filtered high frequency signal is provided to down-converter 270, which converts the filtered high frequency signal to a baseband frequency by mixing the high frequency signal with a local oscillator signal 273 (generated by a local oscillator, not shown, but deemed to be contained in OFDM receiver 260). Down-converter 270 filters the output of the mixing process to produce a base-band OFDM signal on path 271.

OFDM demodulator 275 demodulates the OFDM signal to generate a stream of bits corresponding to each sub-channel. The corresponding set of sub-carriers to be used for the demodulation (which may be the same as used in the transmitter of the OFDM signal received by antenna 261) may be provided (or the sub-carrier frequencies may be specified by microprocessor 290) to OFDM demodulator 275 on path 274 (assuming transceiver 200 represents a BS). When transceiver 200 represents a subscriber station, the sub-carrier frequencies to be used may be specified (by the corresponding base station) as data received by antenna 261. Microprocessor 290 may then indicate to OFDM demodulator the sub-carrier frequencies to be used via path 274. Sub-carriers used in OFDM demodulator 275 form/represent a corresponding (receive) sub-channel. OFDM demodulator 275 may be implemented in digital domain by sampling the OFDM signal with a desired sampling rate (typically equal to the inverse of the OFDM symbol period).

Microprocessor 290 receives the stream of bits from OFDM demodulator 275 on path 268, and may perform various operations on the received bit stream potentially to provide various user applications (e.g., web browsing, voice call, teleconferencing, etc.). Although shown contained within OFDM transceiver 200, microprocessor 290 may also be provided as a unit separate from transceiver 200. Path 291 may contain paths 201, 202, 203, 204 and 274, for example.

Memory 295 stores program (instructions) and/or data used by microprocessor 290 to provide several features operative in OFDMA transceiver 200, and may be implemented as RAM, ROM, flash, etc, and thus contains volatile as well as non-volatile storage elements. Thus, memory 295 represents a computer (in general, machine) readable (storage) medium having stored therein executable modules and/or data.

Although OFDM transceiver 200 is shown containing a microprocessor, other embodiments may be implemented using application-specific integrated circuits (ASIC), field-programmable gate arrays (FPGA) etc, in place of one or more components shown in FIG. 2A.

It is noted here that when transceiver 200 represents a subscriber station, the sub-carriers noted above as being provided on paths 204 and 274 may instead be provided/specified (by a corresponding BS) as data, which is contained in the signal received via receiver antenna 261.

In an embodiment, the sub-carriers used to form sub-channels provide better interference diversity. Referring again to FIG. 1, assume a scenario (scenario A) in which subscriber station 132 (in cell 130) is allocated frequencies f1, f2, and f3 (for example, for use in the DL direction). Further assume that subscriber station 121 (in cell 120) is allocated frequencies f3, f4, and f7, with subscriber station 122 (also in cell 120) being allocated frequencies f1, f5 and f6. In such a scenario (scenario A), sub-carriers f3 (i.e., sub-carrier frequency f3 used by each of subscriber stations 132 and 121) may interfere, and the extent of interference depends on the power levels of the sub-carriers (f3) and the proximity of subscriber stations 132 and 121. Sub-carriers f1 in subscriber stations 132 and 122 could also interfere, with the extent of interference again depending on the power levels of the sub-carriers (f1) and the proximity of subscriber stations 132 and 122. Assuming subscriber station 122 is farther away from subscriber station 132 compared to subscriber station 121, interference due to common sub-carriers f1 would be less than in the case of the common sub-carriers f3.

Now assume another scenario (referenced as scenario B) in which subscriber station 132 is allocated frequencies f1, f2, and f3, subscriber station 121 is allocated frequencies f2, f3, and f4, and subscriber station 122 is being allocated frequencies f5, f6 and f7. In scenario B, there would be no interference between sub-carriers allocated to subscriber stations 132 and 122. However, since the same frequency f2 is used by both subscriber stations 132 and 121 interference could occur. Similarly, since the same frequency f3 is used by both subscriber stations 132 and 121, interference could again occur. Further, the extent of interference on sub-carriers f2 and f3 would be the same (assuming equal powers for sub-carriers f2 and f3 in both the subscriber stations). It may be appreciated that in this example case such interference would be more severe (compared to scenario A noted above), and may have an adverse effect on data decoding in subscriber stations 132 and 121. Scenario A may be termed as providing higher interference diversity than scenario B.

Thus, interference diversity implies receiving different levels of interference on the sub-carriers in a sub-channel. In general, a fewer number of common sub-carriers (same frequency) or a greater amount of differences in the levels of interference between common sub-carriers in a pair of sub-channels results in larger interference diversity (as illustrated by scenario A above), and vice versa (e.g., scenario B above). Sub-carrier allocation/assignment to sub-channels can be designed to maximize interference diversity.

In a technique specified by 802.16 Part 16: Air Interface for Broadband (the details of which are available from IEEE, 3 Park Avenue, New York, N.Y. 10016-5997, USA), sub-carriers are assigned to sub-channels in different cells in a permuted predetermined order. The specific assignment techniques are described in detail in section 8.4.6.1.2.1.1 (DL sub-channels subcarrier allocation in PUSC) of the standard noted above. This technique is briefly explained next with reference to FIG. 2B.

Figure 2B:
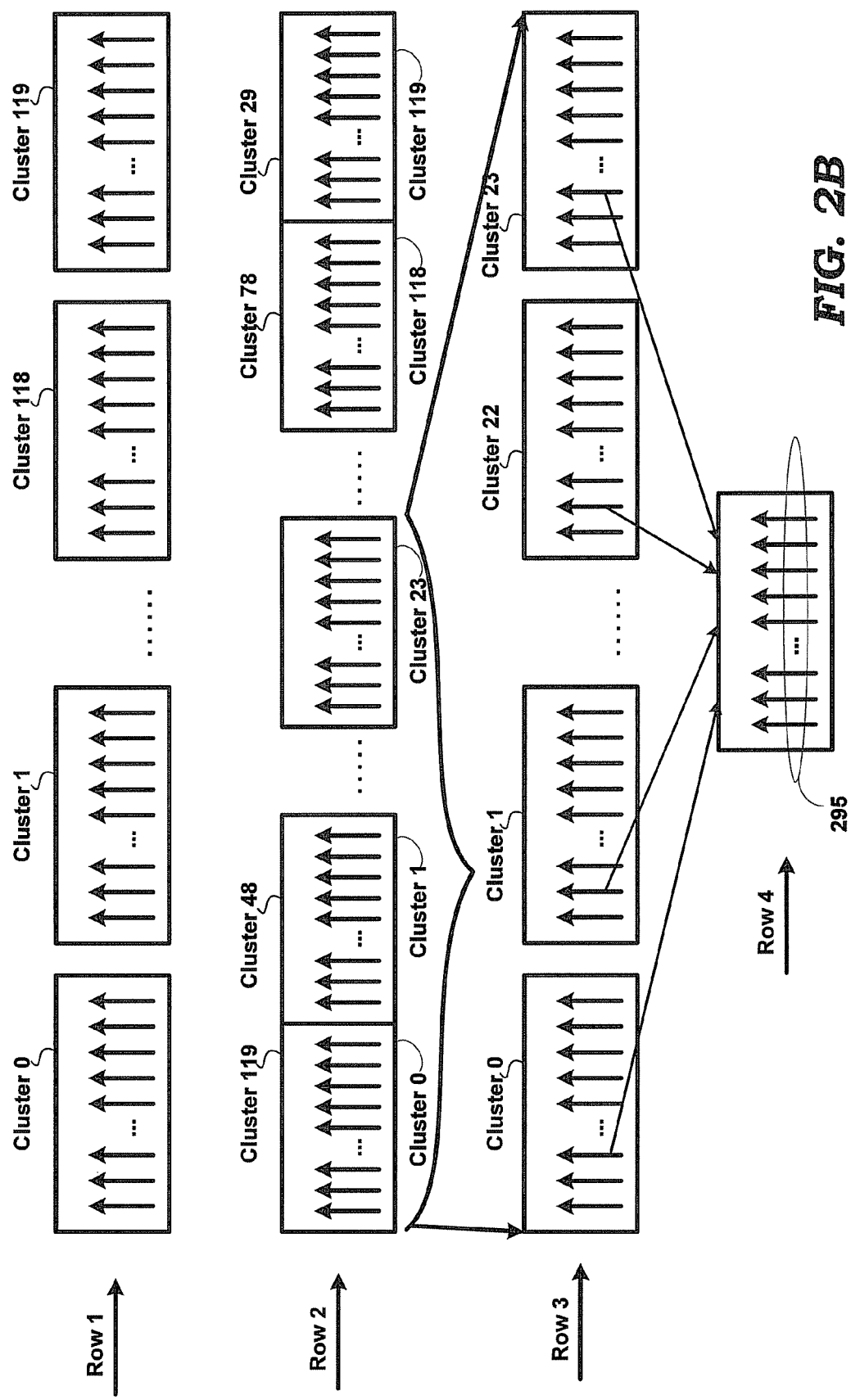
FIG. 2B is a diagram illustrating an example manner in which sub-carriers are assigned to sub-channels in an embodiment of an OFDMA system.

Referring now to FIG. 2B, a total of the designated set of sub-carriers allocated for use in forming sub-channels is divided into 120 physical clusters (cluster 0 through cluster 119 as shown in Row 1), and each cluster contains multiple subcarrier indices. The clusters are reordered as shown in Row 2, and the re-ordering is performed according to a formula that differs based on an identification number (DL_Permbase) of a cell.

The logical clusters are then split into groups, and a group formed of logical clusters 0-23 is shown in Row 3. One sub-carrier from each logical cluster in a group is then assigned to form a sub-channel (295), as indicated in rows 3 and 4. Thus, interference diversity is achieved by assigning sub-carriers to sub-channels in different cells in a pre-determined and deterministic manner.

Various aspects and embodiments are described next with several examples for illustration.

2. Sub-channelization Technique

Figure 3:
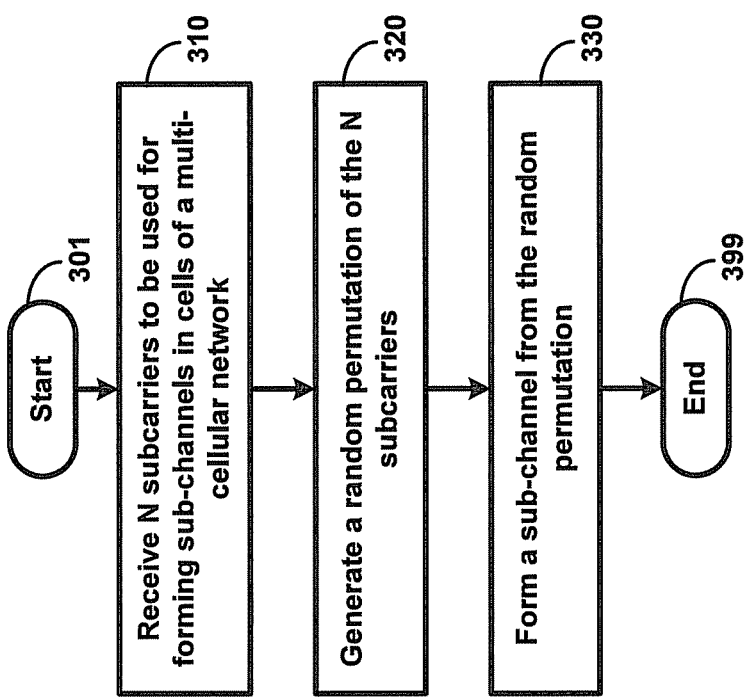
FIG. 3 is a flowchart illustrating an example method of assigning sub-carriers to sub-channels in an example embodiment of an OFDMA system.

FIG. 3 is a flowchart illustrating an example sub-channelization technique in a cell in an OFDMA system. The description throughout this document is provided with respect to sub-channels to be formed in cells for use in the down-link (BS to subscriber station) communication direction. However, similar or identical techniques can be used for the up-link direction as well. The flowchart starts in step 301, in which control passes immediately to step 310.

In step 310, a base station (BS) receives N sub-carriers to be used for forming sub-channels in the corresponding cell. The communication frequencies and number of the N sub-carriers may be predetermined based on specific requirements such as a number of subscribers to be accommodated in the cell, type of information (e.g., data, voice, images, etc.) to be communicated, etc. Control then passes to step 320.

In step 320, the BS generates a random permutation of the N sub-carriers. In an embodiment, the random permutation is generated based on the operation of a shuffle/permuting algorithm controlled by an output of a pseudo random number generator (PRNG). Control then passes to step 330.

In step 330, the BS forms a sub-channel for use by a subscriber station in the cell (controlled by the BS) using the random permutation obtained in step 320.

The BS may form another sub-channel for the same cell by sequentially selecting sub-carriers from the shuffled set obtained in step 320. In one example, the term random permutation of N carriers as noted with respect to step 320 means that the specific permutation (sequence or order) of the sub-carriers is not determinable a priori, or based on application of a formula as noted with respect to the technique described with respect to FIG. 2B, but rather is generated based on the operation of a shuffling (or, in general, randomizing) algorithm.

In contrast to the example technique noted above in FIG. 2B (in which a set of sub-carriers are assigned to a sub-channel in a deterministic fashion), the sub-carriers are assigned based upon an output of a PRNG, and once an initial state of the PRNG is determined, assignment of the sub-carriers can be performed. The output of the PRNG provides an index to shuffle assignment of the sub-carriers using a random permutation generator. Thus, for example, any two sub-channels are likely to be substantially different in terms of the sequencing/ordering/positions of the sub-carriers in the randomly permuted sets of sub-carriers. Example illustrations of the technique are provided below.

It is noted that the steps of the flowchart described above may be performed in a BS in the OFDMA system/network. However, the state (and therefore output) of the PRNG in each BS used to generate the random permutation for the corresponding cell is selected to be different, thereby rendering the random permutation obtained in a BS to also be likely to be substantially different from a random permutation obtained in any other BS, in terms of the sequencing/ordering/positions of the sub-carriers.

Random permutations of the N sub-carriers may be generated in any of the multiple base stations in the OFDMA network, or even external to the base stations. In such a scenario, there would be only one random permutation generator device, and the respective generated permutations would then be made available in a suitable manner (e.g., wired/wireless paths) to the respective base stations.

Alternatively, and as noted above, each BS may be designed to contain a 'random permutation generator' block, with all of the 'random permutation generator' blocks (or a sub-component within the block) being synchronized, and each 'random permutation generator' block initialized to a different state. An example embodiment of a 'random permutation generator' block is described next.

3. Random Permutation Generator

Figure 4:
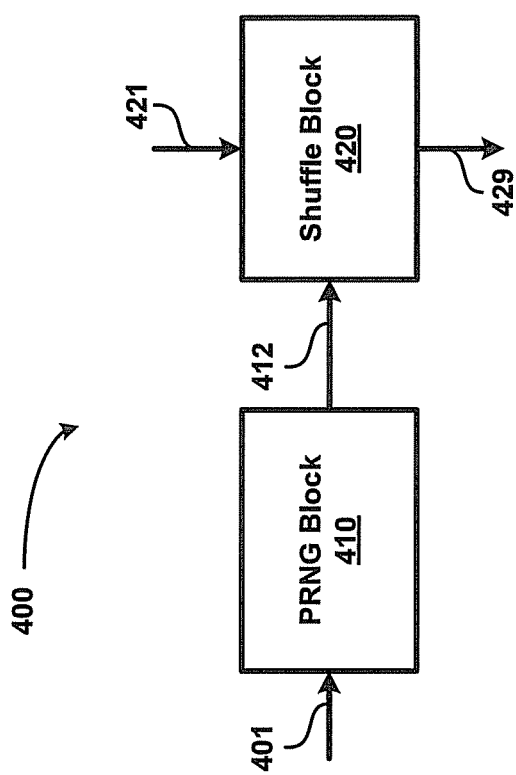
FIG. 4 is a block diagram of an example embodiment of a random permutation generator.

FIG. 4 is a block diagram of an example embodiment of a random permutation generator. Random permutation generator 400 is shown containing pseudo-random number generator (PRNG) block 410 and shuffle block 420.

PRNG block 410 receives an initialization state in the form of a seed value and an offset on path 401. The combination of the seed value and offset value defines an "initial state" of PRNG block 410, and therefore of random permutation generator 400. PRNG block 410 may receive a clock signal (not shown) that causes the PRNG block 410 to advance through iterations/states, and each iteration or state generates a random number provided on path 412. Path 401 may be connected to a data store containing the seed and offset. Alternatively, an operator of an OFDMA system in which PRNG block 410 is used may provide the seed and offset values as input via a suitable input interface, not shown. Alternatively, the seed and offset values may be provided through a network.

PRNG block 410 may be implemented using any of several techniques, such as but not limited to, linear feedback shift registers (LFSR), and may be designed to satisfy desired criteria for degree of randomness provided. In an embodiment, PRNG 410 is implemented as Mersenne Twister (MT 19937), the details of which are described in the document titled "A 623-Dimensionally Equidistributed Uniform Pseudo-Random Number Generator" by Makoto Matsumoto, Takuji Nishimura, Mersenne Twister: ACM Trans. Model. Comput. Simul. 8(1): 3-30 (1998). Other embodiments may implement PRNG block 410 as a 'Linear Congruence Generator', for example.

Shuffle block 420 receives multiple sub-carrier indices (each representing a corresponding subcarrier) on path 421, shuffles/re-orders the subcarrier indices using the random number received on path 412, and provides re-ordered sequences of the sub-carrier indices on path 429. The sub-carrier indices provided on path 421 may be retrieved from a data store (not shown) in the corresponding base station with the specific frequencies of the sub-carriers being set according to the deployment environment. Alternatively, the sub-carrier indices may be provided by the source/entity that provides the seed and offset to PRNG block 410.

Shuffle block 420 provides desired sequences of sub-carrier indices (for example, final permuted sets such as set 604, as described below with respect to FIG. 6) on path 429. Path 429 may be connected to a transmitter, which transmits the desired sequences on wired or wireless paths. In an embodiment, random permutation generator 400 is contained in a base station implemented as described in FIG. 2A, and path 429 may be connected to microprocessor 290. In that instance, microprocessor 290 processes each sequence (e.g., final permuted set 604 of FIG. 6) received on path 429 to extract the specific sub-carrier indices in the sequence to be used for forming a corresponding sub-channel, and provides the indices (or frequency values) to OFDM transmitter 210, which then transmits the indices via antenna 249 to corresponding subscriber stations.

A subscriber station implemented as OFDM transceiver 200 of FIG. 2A, may receive via antenna 261, the corresponding set of sub-carrier indices transmitted on path 429 (or by a base station as noted above). Microprocessor 290 of the subscriber station may then process the set of sub-carrier indices to obtain/determine (as described below with respect to FIG. 6) sub-carrier frequencies corresponding to respective sub-channels, and provide the sub-carrier frequencies to OFDM modulator 220 and OFDM demodulator 275 in the subscriber station.

Random permutation generator 400 can be implemented using hardware, or as modules containing instructions for a processor. When implemented as modules, the instructions and data implementing random permutation generator 400 are stored in a non-volatile memory, such as memory 295 of FIG. 2A.

In an embodiment, shuffle block 420 operates according to Sattolo's shuffle algorithm, the details of which are available in the document titled "Overview of Sattolo's Algorithm" by Wilson, Mark C. (2004-06-21), in F. Chyzak (ed.), Algorithms Seminar 2002-2004. INRIA Research Report. 5542. In alternative embodiments, 'Fisher-Yates Shuffle' may be used alternately to Sattolo's shuffle, and is described in "Algorithm 235: Random permutation" by Richard Durstenfeld, July 1964, Communications of the ACM 7 (7): 420. doi:10.1145/364520.364540. The operation of Sattolo's shuffle algorithm is briefly described with reference to the table of FIG. 5.

In FIG. 5, Sattolo's shuffle algorithm is illustrated with respect to its operation considering a set of five (5) integers, shown in row 1 ordered/sequenced as '12345' at initialization, the number at each of the five positions referred for convenience as an 'entry'. In the first iteration, the algorithm receives as input a randomly generated number (3 in the example) specifying a position (position 3 among positions 1 through 5) to be used for swapping. Accordingly, the algorithm swaps the positions of 'entries' at positions 3 (the random number obtained for the iteration) and 5 (as in (n−i+1) of the 'current ordering', wherein n is the number of entries, and T represents the current iteration (1)). The ordering/sequence '12543' is obtained, as shown in row 2.

In the second iteration, the algorithm receives as input a randomly generated number (1 in the example) specifying a position (1 through 5) to be used for swapping. Accordingly, the algorithm swaps the positions of 'entries' at positions 1 (the random number obtained for the iteration) and 4 (n−i+1) of the 'current ordering'. The ordering/sequence '42513' is obtained, as shown in row 3. The sequences '45213' and '54213' are similarly obtained in the next two iterations, as shown in row 4 and row 5 respectively, with the randomly generated input being 2 and 1 for the respective iterations.

Thus, the shuffle algorithm proceeds through N iterations, and generates at the end of N iterations a permuted sequence of N input 'entries. With respect to FIG. 4, the randomly generated number to be used for each iteration of the shuffle algorithm operative in shuffle block 420 is provided on path 412 by PRNG block 410. It is noted here that the random number for each iteration (according to Sattolo's algorithm) can take on an 'entry' value of integers only in the range {1, . . . , n−i}, wherein 'i' and 'n' have meanings as noted above.

Figure 6:
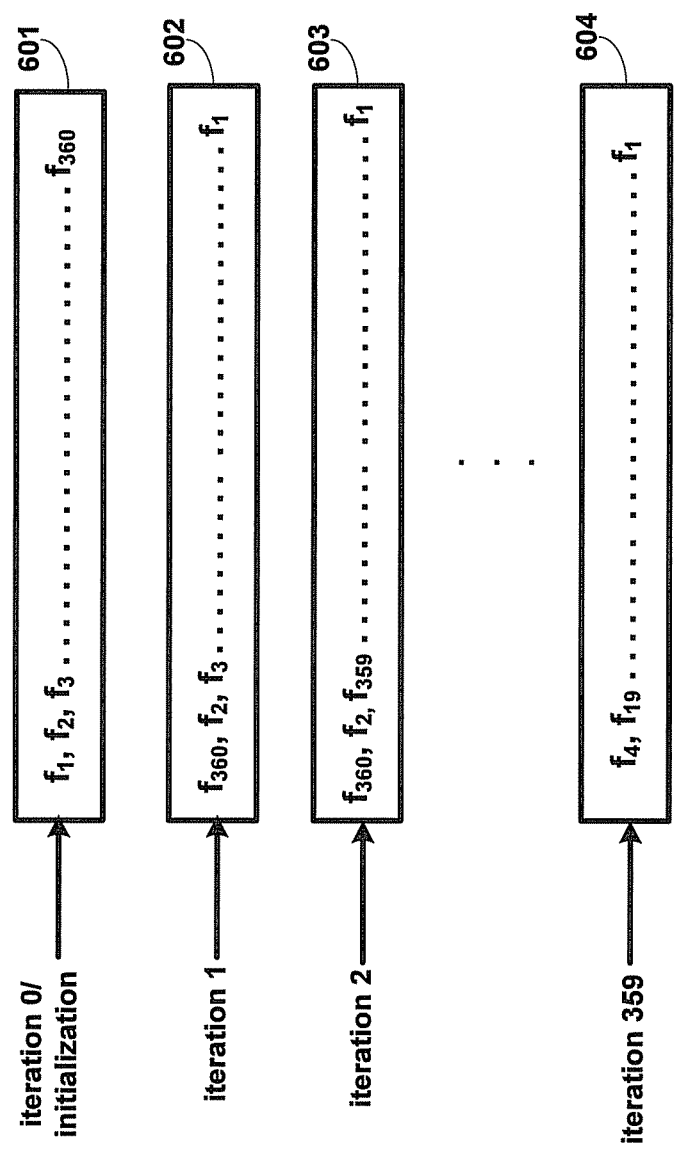
FIG. 6 is a diagram illustrating an example manner in which a random permuted sequence of sub-carriers is generated, in an embodiment.

The operation of random permutation generator 400 with an example that uses MT 19937 as PRNG block 410 and Sattolo's shuffle as Shuffle block 420 is now provided, with reference to FIG. 6. For illustrative purposes, it is assumed in the example that shuffle block 420 receives, on path 421, three hundred and sixty sub-carrier indices. However, it may be appreciated that other number of subcarrier indices are also possible. The indices may correspond to desired requirements based on the specifications of the OFDMA system, or a standard (e.g., TREE 80216™).

The illustration in FIG. 6 assumes that 360 sub-carrier indices (each index representing a corresponding one of 360 sub-carrier/subcarrier frequencies available for assignment to a sub-channel) are initially ordered as shown as set 601, against iteration 0/initialization, prior to the start of operation of random permutation generator 400. At the end of iteration 1, based on a random number generated by PRNG block 410 received as input, shuffle block 420 provides (iteration 1) the re-ordered sequence of sub-carrier indices, as shown with respect to set 602. Depending on the specific implementation of PRNG 410, the random number generated by PRNG 410 may be modified (internal to PRNG block 410) by a suitable mathematical operation such as multiplication, addition etc., by a desired factor prior to being provided to shuffle block 420.

It is noted that, when implemented as MT 19937, the output of PRNG 410 is a random number with a value between 0 and 1. Thus, when 360 sub-carrier indices are to be shuffled, the output of MT 19937 may be multiplied by the factor 360, and the resulting product (or the floor value of the product) may then be provided as the random number to shuffle block 420. For example, an output of 0.9999 provided by MT 19937 may be multiplied by 360 to obtain the number 359.964, and the floor value of 359.964 (which is 359) may then be provided to shuffle block 420.

The reordering is performed in a manner similar to that described with respect to FIG. 5 above. Merely for illustration, the first, second and $360^{th}$ indices of the re-ordered set are shown as corresponding to sub-carrier indices f360, f2 and f1. The actual indices and the sub-carrier frequencies they refer to would depend on the operation of random permutation generator 400, and the set of N sub-carrier indices selected at initialization.

At the end of iteration 2, again based on a random number generated by PRNG block 410, shuffle block 420 provides the re-ordered sequence of sub-carrier indices, as shown with respect to set 603. Again, the indices of the re-ordered set are shown as corresponding to frequencies f360, f2 and f359. The actual indices and the sub-carrier frequencies they refer to would depend on the operation of random permutation generator 400.

In the embodiment, random permutation generator 400 is allowed to run through 359 iterations, i.e., shuffle block 420 performs 359 shuffles to generate, at the end of the $359^{th}$ shuffle, a (final) set of random permuted sub-carrier indices based on which sub-carriers for all sub-channels for one cell are determined. Sub-carrier indices for all sub-channels of another cell are generated based on the output (random permuted set) obtained at the end of the next 359 iterations of (the combination of PRNG 410 and) shuffle block 420.

PRNG block 410 provides one random number for each iteration of shuffle block 420. It is noted that in embodiments in which shuffle block 420 is implemented according to Sattolo's shuffle algorithm, the random number input to be used by shuffle block 420 is constrained to fall within a certain range of values, as may also be observed from the example of FIG. 5. Hence, more than 359 outputs of PRNG block 410 may be needed for 359 shuffles in shuffle block 420 due to the constraint noted above.

In FIG. 6, the set 604 is assumed to be obtained at the end of the $359^{th}$ iteration corresponding to the generation of one set of sub-carrier indices for use in forming sub-channels for one cell. Again, the first, second and $360^{th}$ indices of the set 604 are shown as corresponding to frequencies f4, f19 and f1 merely by way of illustration.

Permuted set 604, obtained at the end of 359 iterations of random permutation generator 400 is used as the basis for assigning sub-carriers to sub-channels in a cell, as described below. However, it may be appreciated, that more or fewer iterations (than 359 of the example) of random permutation generator 400 can be used to obtain a 'final' permuted set using which sub-channel formation for a cell may be performed.

In an OFDMA network designed with each BS containing its own random permutation generator, the operations (359 iterations) may be performed in each random permutation generator in each BS in the OFDMA system. In such a scenario, each of the random permutation generators in the corresponding base stations may be initialized with a same initial state (i.e., a same seed value), but with different offsets. Thus, in the example illustrated above with respect to FIG. 6, the initial seed value would be the same, but the offsets in each of the random permutation generators would differ by 359.

Thus, the random permutation generator in each BS would iterate through 359 (or a different desired number) of iterations, and provide at the end of the iterations a randomly permuted set of sub-carrier indices. For example, assuming 32 cells are present in the OFDMA system, 32 sets of different randomly generated permutations (P0 through P31) of the same number (360) of the same ones of subcarrier indices would be obtained.

In a 'distributed' approach as noted above, each of the PRNG blocks (in the respective base stations) may be initialized with a same 'seed' value (initial state), but with a different offset. In the embodiment described with respect to FIG. 6, the offsets are different (offset from each other) by a number that is 359 or greater. The shuffle block (and thus the random permutation generator) for all cells (and thus all base stations) is initialized with set 601 (i.e. the sub-carrier indices arranged in ascending order from 1-360), shown in FIG. 6. Cell number 0 may use an offset of, for example zero, for its PRNG block, and generate the permuted set 604 at the end of 359 shuffles. Cell number 1 begins shuffle operations with its PRNG block starting from a state corresponding to the final state of the PRNG block of cell number 0, and shuffling through 359 shuffles to generate a (final) permuted set to be used for cell number 1. Cell number 2 begins shuffle operations with its PRNG block starting from a state corresponding to the final state of the PRNG block of cell number 1, and shuffling through 359 shuffles to generate a (final) permuted set to be used for cell number 2. Operations in other cells are performed in a similar manner.

Alternatively, one or more random permutation generators may be used external to (or within one of the base stations), with the permuted set of sub-carriers obtained at the end of every 359 iterations (or other desired number of iterations) being provided to a corresponding cell. Irrespective of the specific implementation, each BS broadcasts the seed and offset number used within the random permutation generator in the BS to enable subscriber stations to generate sub-carriers to be used to receive OFDM signals from the BS in its cell.

Examples of which sub-channels for each cell are formed based on the (final) permuted set obtained for the cell, is described next.

4. Sub-Channelization in a Cell Based on a Permuted Set of Sub-Carriers

In an embodiment, the indices in the final set of permuted sub-carrier indices obtained as described above are divided into groups. The sub-carriers in a group are then assigned to form a sub-channel in the cell. To illustrate an example, labeling final permuted set 604 of FIG. 6 as P0 to be used for forming sub-channels for cell 0, $$P0 = (f_4, f_{19}, \ldots, f_1) \quad \text{Equation (1)}$$

wherein, $(f_4, f_{19} \ldots f_1)$ represents the physical ordering of the sub-carriers in P0, and may be mathematically be denoted as shown below:

$$P0 = (f_4, f_{19}, \ldots, f_1) = (s_{0,0}, s_{0,1}, \ldots, s_{0,359}) \quad \text{Equation (2)}$$

wherein, $s_{0,0}$ corresponds to $f_4$, $s_{0,1}$ corresponds to $f_{19}$, and so on.

The 360 subcarrier indices in set P0 are divided into M number of groups, and the M groups each contain L contiguous subcarrier indices in P0. In an embodiment, M equals 15, L equals 24, and the first 24 subcarrier indices in P0 are assigned to form sub-channel 1, while the second 24 subcarrier indices are assigned to form sub-channel 2, and so on, with a total of 15 sub-channels each formed of 24 corresponding sub-carriers.

Operations similar to those noted above with respect to a final permuted set P0 (for cell 0) are performed for each of the final permuted sets P1 through P31 (and respectively corresponding to cell 1 through cell 31 and assuming that the OFDMA network contains 32 cells), to form sub-channels in the other cells as well. It may be appreciated that the above approaches of assigning sub-carriers to sub-channels in cells of an OFDMA system being based on random number generation to randomly reorder a group of designated sub-carriers prior to assignment may increase a likelihood that the same sub-carriers (re)used in multiple different cells interfere in different degrees, thereby providing a higher (and therefore more desirable) measure of interference diversity in the OFDMA system.

The above statement may be appreciated based on the consideration that the sub-carrier assignment approach increases the likelihood of interference on any sub-channel (e.g., a reference sub-channel) to be caused by sub-carriers of more (rather than fewer) interfering sub-channels (e.g., from other cells). The probability of the more number of interfering sub-channels being at different distances from the reference sub-channels may translate to different levels of interference on the individual sub-carriers of the reference sub-channel, thereby increasing the interference diversity, and reducing an overall interference and likelihood of data/information loss, for example.

According to another aspect, a quantitative value termed Interference Diversity Metric or IDM, that represents interference diversity is computed. The manner in which this is performed in an example embodiment is described next.

5. Quantifying Interference Diversity

In an embodiment, IDM is computed based on a consideration that if there are more interference-contributing sub-channels from a neighboring cell, then the interference diversity experienced is higher than in the case where there are a lesser number of interference contributing sub-channels from a neighboring cell. IDM is computed for a reference sub-channel in a reference cell based on the following parameters: (1.) The number of interfering sub-channels with respect to a reference sub-channel in a reference cell; and (2.) The sub-carrier distribution from the interfering sub-channels with respect to a reference sub-channel in a reference cell.

The following example considerations and goals are further taken into account to compute the IDM.

a) The interference diversity per reference sub-channel is to be quantified by the metric x, where x has a value between 0 and 1.
b) The most optimal interference diversity is deemed to be attained when x=1.
c) The least optimal interference diversity is deemed to be attained when x=0.
d) A value x1 greater than x2 indicates a better interference diversity corresponding to x1 than x2.
e) Interference diversity is deemed more optimal when all the sub-channels in a cell contribute interfering sub-carriers towards a reference sub-channel in a reference cell.
f) Interference diversity is deemed less optimal when only one sub-channel in a cell contributes interfering sub-carriers towards a reference sub-channel in a reference cell.
g) The number of sub-channels contributing to interference should be an indicator of the interference diversity metric. A greater number of interfering sub-channels from a neighboring cell with respect to the reference subchannel in the reference cell should indicate better interference diversity and vice versa.
h) A large number of contributing interfering sub-carriers from a sub-channel should be reflected as a proportional decrease in the interference diversity metric (IDM).

In an embodiment, IDM can be computed as described below. Representing 'm' as a total number of sub-channels in a sector of a reference cell, 'n' as a total number of sub-channels in the reference cell, and 'threshold' as a number of sub-carriers above which the contribution from interfering sub-carriers in an interfering sub-channel towards a reference sub-channel is not considered, a number of contributing interference sub-carriers from each sub-channel in a neighboring co-channel cell towards a reference sub-channel in the reference cell is determined. The value for 'threshold' may be set based on desired system performance requirements.

Representing 'count' as a number of sub-channels from which a number of interference contributing sub-carriers is less than or equal to threshold, a value of x (e.g., the IDM) for the reference sub-channel in the reference cell is computed as noted below:

$$IDM = \left[\frac{count}{n}\right] \quad \text{Equation (3)}$$

Figure 7:
FIG. 7 shows a table used to illustrate the computation, according to an example embodiment of interference diversity metrics for sub-channels in a cell.

The technique described above is illustrated with an example interference scenario shown in the table of FIG. 7, in which IDM values are shown computed for five reference sub-channels in a reference cell. It is assumed in the example that interference contribution to each of the five reference sub-channels comes from fifteen sub-channels, each formed of twenty four sub-carriers in a neighboring cell. The fifteen sub-channels are shown sequentially numbered 1 through 15 in column 2 of the table of FIG. 7. Thus, the value of 'n' for the example is 15. The value of 'threshold' (noted above) for the example is chosen as 8.

With reference to FIG. 7, a weight of '1' is assigned for every non-zero entry (non-zero number of sub-carriers contributing to interference) less than or equal to the threshold of 8, and a weight of 0 is assigned to an entry otherwise. To illustrate, only one sub-carrier (circled and labeled as A in FIG. 7) from sub-channel 1 in the neighboring cell contributes to interference with reference sub-channel 1. Accordingly, a weight of 1 is assigned (assignment not shown in the Figure) corresponding to the entry. Eleven sub-carriers (circled and labeled as B in FIG. 7) from sub-channel 1 in the neighboring cell contribute to interference with reference sub-channel 5. Accordingly, a weight of 0 is assigned corresponding to the entry.

The interference diversity metric (IDM) for a reference sub-channel is the sum of all the weights. It may be verified that the IDM for reference sub-channels 1 through 5 are as noted in the corresponding rows of column 3. It may be appreciated from the foregoing description and from the IDM values in column 3, that interference diversity is highest for reference sub-channel 1, and is progressively worse for reference sub-channels 2 through 5. In a base station implemented as OFDM transceiver 200 of FIG. 2A, microprocessor 290 may compute the IDM as described above.

Once sub-carriers are assigned to sub-channels according to the techniques described above, IDM values for the sub-channels thus formed may be computed as described above, and according to Equation (3). Assuming, one or more of the sub-channels in a cell have poor (low) IDM values, the sub-channel formation for the cells could be performed afresh to attempt to receive acceptable or alternate values of IDMs for all sub-channels.

References throughout this specification to "one embodiment", "an embodiment", or similar language means that a particular feature, structure, or characteristic described in connection with the embodiment is included in at least one embodiment. Thus, appearances of the phrases "in one embodiment", "in an embodiment" and similar language throughout this specification may, but do not necessarily, all refer to the same embodiment.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method of forming sub-channels in an OFDMA network comprising:
   receiving a plurality of sub-carrier indices representing corresponding sub-carriers to be used for forming sub-channels in a cell of a network;
   generating a random permutation of the plurality of sub-carrier indices based on an output of a pseudo-random number generator (PRNG); and
   forming a sub-channel in the cell from the sub-carriers represented by a portion of the random permutation,
      wherein the receiving, the generating, and the forming are performed in a device including the PRNG and a shuffle block, and
      wherein a same intial state value and different offset values of the PRNG are used to generate the random permutation and a second random permutation.

2. The method of claim 1, wherein the generating further comprises:
   forming a first sequence of sub-carrier indices representing the sub-carriers;
   receiving a random number as the output from the PRNG; and
   re-ordering the first sequence based on the random number to form a second sequence of sub-carrier indices.

3. The method of claim 2, wherein the forming a first sequence, the receiving a random number and the re-ordering are performed one or more times to obtain a final sequence of the sub-carrier indices, the final sequence representing the random permutation of the plurality of sub-carrier indices.

4. The method of claim 3, wherein sub-carriers corresponding to a first group of successive sub-carrier indices in the final sequence are assigned to form the sub-channel, and sub-carriers corresponding to a second group of successive sub-carrier indices in the final sequence are assigned to form a second sub-channel,
   wherein there are no indices common to the first group and the second group, and
   wherein the sub-channel and the second sub-channel are formed for the first cell.

5. The method of claim 4, wherein the re-ordering is performed using a shuffle technique.

6. The method of claim 5, further comprising computing a number representing a measure of interference diversity for the first cell.

7. The method of claim 1, wherein the device containing the PRNG and a shuffle block performs the receiving, the generating, and the forming within a base station corresponding to each one of the plurality of cells.

8. A non-transitory machine readable medium storing one or more sequences of instructions for causing a computing system to form sub-channels in an OFDMA network, wherein execution of the one or more sequences of instructions by one or more processors contained in the computing system causes the computing system to perform operations comprising:
   receiving a first sequence of sub-carrier indices representing corresponding sub-carriers to be used for forming sub-channels in cells of the network;
   generating a re-ordered sequence of the sub-carrier indices, the generating being performed based on an output of a pseudo-random number generator (PRNG); and
   forming a sub-channel in a first cell in the plurality of cells using sub-carriers represented by a first set of successive sub-carrier indices in the re-ordered sequence of the sub-carrier indices;
   wherein the computing system is contained in a base station in a cell in the plurality of cells, and performs the receiving, the generating, and the forming to form one or more sub-channels for each of the plurality of cells, the base station containing the PRNG, and
   wherein a same initial state value and different offset values of the PRNG are used to generate a random permutation and a second random permutation.

9. The non-transitory machine readable medium of claim 8, wherein the execution of the one or more sequences of instructions by the one or more processors contained in the computing system causes the computing system to further perform operations comprising:
   forming a second sub-channel in the first cell using sub-carriers represented by a second set of successive sub-carrier indices in the re-ordered sequence of the sub-carrier indices,
   wherein there are no sub-carrier indices common to the first set and the second set, and
   wherein the sub-channel and the second sub-channel are formed for the first cell.

10. The non-transitory machine readable medium of claim 8, wherein the execution of said one or more sequences of instructions by one or more processors contained in the computing system further causes the computing system to perform the actions of computing a number representing a measure of interference diversity for the first cell.

11. The non-transitory machine readable medium of claim 8, wherein the PRNG is implemented as Mersenne Twister 19937.

12. The non-transitory machine readable medium of claim 11, wherein the generating the re-ordered sequence is performed using Sattolo's shuffle technique.

13. A system comprising:
   a pseudo random number generator (PRNG);
   a shuffle block configured to receive a first sequence of sub-carrier indices representing corresponding sub-carriers to be used for forming sub-channels in a cell of an OFDMA network, the shuffle block configured to re-order the first sequence of sub-carrier indices based on a random number provided by the PRNG and to generate a final sequence of sub-carrier indices; and
   a processor configured to form a sub-channel for the cell using sub-carriers represented by a set of successive sub-carrier indices in the final sequence of sub-carrier indices,
      wherein a same initial state value and different offset values of the PRNG are used to generate a random permutation and a second random permutation.

14. The system of claim 13, further comprising:
an OFDM transmitter, wherein the OFDM transmitter receives the set from the processor, and transmits the set.

15. The system of claim 14, wherein the PRNG is implemented as Mersenne Twister 19937.

16. The system of claim 14, wherein the processor computes a number representing a measure of interference diversity for the cell in the OFDMA network.

* * * * *

UNITED STATES PATENT AND TRADEMARK OFFICE
CERTIFICATE OF CORRECTION

| | | |
|---|---|---|
| PATENT NO. | : 8,665,697 B1 | Page 1 of 1 |
| APPLICATION NO. | : 12/645709 | |
| DATED | : March 4, 2014 | |
| INVENTOR(S) | : Venugopalan et al. | |

It is certified that error appears in the above-identified patent and that said Letters Patent is hereby corrected as shown below:

In the Specification

In Column 2, Line 60, delete "digits)" and insert -- digit(s) --, therefor.

In Column 5, Lines 40-41, delete "f1, 12, and 13, subscriber" and insert -- f1, f2 and f3, subscriber --, therefor.

In Column 5, Line 41, delete "12, f3," and insert -- f2, f3, --, therefor.

In Column 5, Line 43, delete "and 17." and insert -- and f7. --, therefor.

In Column 5, Line 45, delete "frequency 12" and insert -- frequency f2 --, therefor.

In Column 8, Line 60, delete "T represents" and insert -- 'i' represents --, therefor.

In Column 9, Line 24, delete "TREE" and insert -- IEEE --, therefor.

In the Claims

In Column 15, Line 35, in Claim 1, delete "intial" and insert -- initial --, therefor.

In Column 16, Line 41, in Claim 10, delete "said one" and insert -- the one --, therefor.

Signed and Sealed this
First Day of July, 2014

Michelle K. Lee
*Deputy Director of the United States Patent and Trademark Office*